E. PEMBERTON.
BURNER.
APPLICATION FILED JAN. 10, 1921.

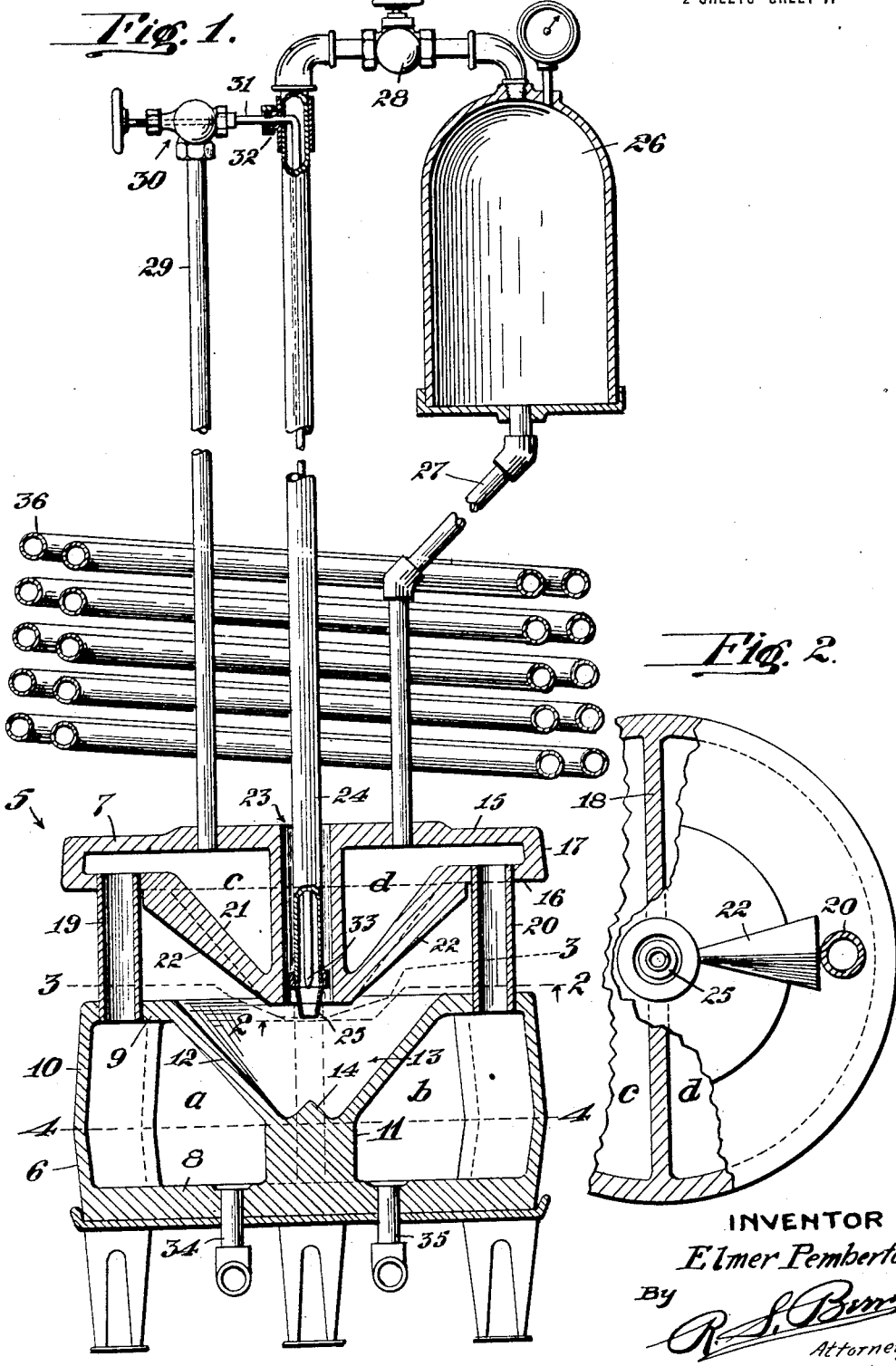

1,396,381.

Patented Nov. 8, 1921.

INVENTOR
Elmer Pemberton
By R. S. Berry
Attorney.

UNITED STATES PATENT OFFICE.

ELMER PEMBERTON, OF HYDE PARK, CALIFORNIA.

BURNER.

1,396,381.  Specification of Letters Patent.  Patented Nov. 8, 1921.

Application filed January 10, 1921. Serial No. 436,226.

*To all whom it may concern:*

Be it known that I, ELMER PEMBERTON, a citizen of the United States, residing at Hyde Park, in the county of Los Angeles and State of California, have invented new and useful Improvements in Burners, of which the following is a specification.

This invention relates to a burner which is especially applicable for use in the generation of steam.

An object of the invention is to provide a burner which is adapted to burn either gas or hydrocarbon fuel and the flame generated by the burner readily regulated according to the intensity of heat desired.

Another object is to provide a burner of the above character which is so constructed that the fuel to be burned may be heated to a high degree before being discharged from the burner nozzle by passing through a heating chamber in the burner body so as to insure thorough vaporization of liquid fuels and render the fuel highly combustible, and by which water may be passed through the burner to form steam which may be mixed with the highly heated fuel at the burner nozzle, and whereby steam may be heated to such high degree of temperature as to liberate the hydrogen element so that little or no hydrocarbon fuel will be required to maintain combustion.

Another object is to provide a burner embodying an effective means for spreading a flame throughout a fire box and directing it to steam coils in the latter.

Other objects will appear hereinafter.

The invention is illustrated in the accompanying drawings, in which:

Figure 1 is a view in vertical section of the burner showing the manner of connecting it and arranging it in a fire box.

Fig. 2 is an inverted horizontal section as seen on the line 2—2 of Fig. 1.

Figure 3:
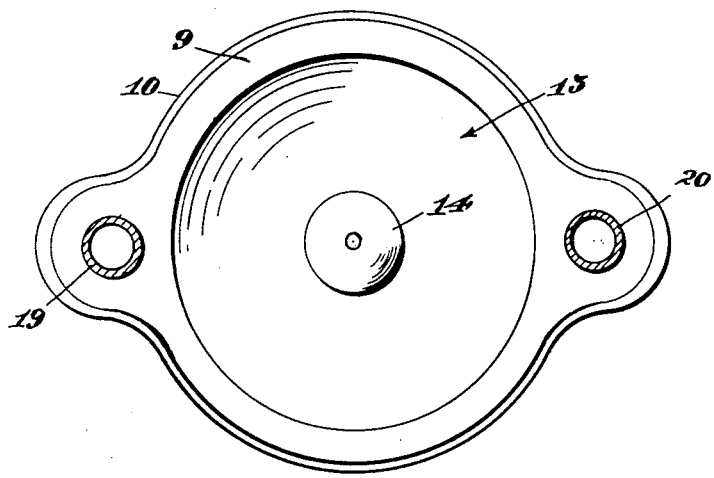
Fig. 3 is a horizontal section and plan view as seen on the line 3—3 of Fig. 1.
Figure 4:
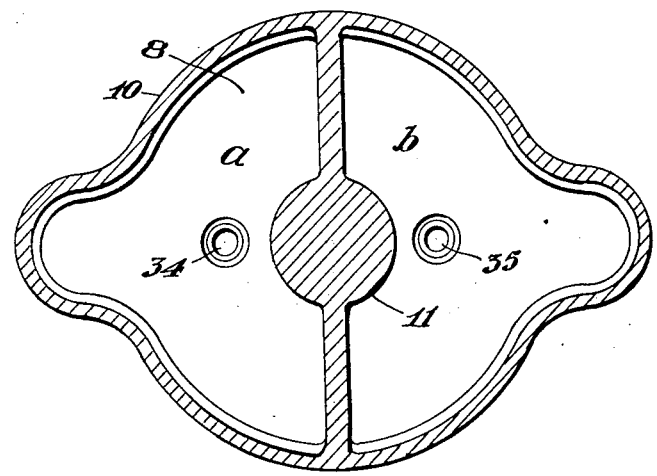
Fig. 4 is a view in horizontal section as seen on the line 4—4 of Fig. 1.

More specifically, 5 indicates a burner which comprises a lower portion 6 and an upper portion 7 disposed in spaced superimposed relation to each other. The lower portion 6 is of hollow formation and comprises a bottom wall 8, a top wall 9, side walls 10, and a transverse partition wall 11 dividing the interior of the member into separate compartments $a$ and $b$. The top wall 9 is formed with a central depressed portion 12 forming a recess 13 having inclined side walls in the form of a cone which converge into a conical protuberance 14 projecting upwardly from the bottom of the recess. The upper member 7 of the burner is circular in plan being hollow and formed with a top wall 15, bottom wall 16, side wall 17, and partition wall 18; the wall 18 dividing the interior of the member 7 into two compartments $c$ and $d$ which are designed to be positioned above the compartments $a$ and $b$ and connected therewith by tubes 19 and 20 which connect the walls 9 and 16 and serve to space the upper member from the lower member. The bottom wall 16 is formed with a central downwardly extending conical portion 21 arranged directly over the conical recess 13 and spaced therefrom; flame spreading ribs 22—22 being formed on the under side of the conical wall 21 opposite the tubes 19 and 20 having inclined side walls, and which ribs serve as flame spreaders to direct a portion of the flames from the tubes.

The top portion 7 is formed with a central opening 23 leading to the apex of the conical wall 21 and through which a nozzle 24 extends. The nozzle 24 is provided with a tip 25 adapted to discharge into the recess 13 directly above the cone 14. The nozzle 24 is formed of pipe which leads from a steam reservoir 26 arranged above the burner and connected to the chamber $d$ through a pipe 27 through which steam is supplied to the reservoir as will later appear. A valve 28 is provided for regulating the flow of steam from the reservoir to the nozzle.

Connecting with the chamber $c$ is a pipe 29 which leads upwardly to a valve 30 having an outlet connecting with a tube 31 passing through a stuffing box 32 and leading downwardly through the steam nozzle 24 and terminating in a tip 33 opening in the tip 25 adjacent to and opposite the discharge orifice of the latter and through which a gaseous or vaporous fuel may be discharged. Connecting with the chamber $a$ is a fuel feed pipe 34 leading from any suitable source of liquid or gas fuel supply and leading from the chamber $b$ is a conduit 35 leading from a source of water supply.

The burner is designed to be mounted in any suitable fire box or combustion chamber not necessary to be here shown, and to be positioned beneath a steam coil 36 arranged in the fire box and having any suitable connections.

In the operation of the invention, fuel and water are delivered to the chambers $a$ and $b$ through the feed pipes 34 and 35, the fuel passing through the tube 19 into the chamber $c$ from whence it may be discharged through the pipe 29, valve 30, tube 31, and nozzle tips 33 and 25. A portion of the water delivered to the chamber $b$ may pass through the chamber $d$ to the tubes 20 and when the burner is in operation steam generated in the chambers $b$ and $d$ will be delivered to the reservoir 26 to the pipe 27 and then may be drawn off through the control valve 28 and discharged through the nozzle 24 and tip 25 and admixed with the fuel discharged from the tip 33.

On ignition of the fuel delivered from the nozzle, flames will be formed in the recess 13 and by reason of the force with which the fuel is discharged from the nozzle the flames will be spread and directed upwardly by the conical wall 12 against the opposed dependent conical walls 21 and spread horizontally by the latter around the upper member 7 of the burner from whence they pass around the steam coils 36.

The flames impinging on the top wall of the lower member 6 and on the bottom wall of the upper member 7 act to heat the chambers $a$, $b$, $c$, and $d$ so as to highly heat the fuel in the chambers $a$ and $c$ and generate steam in the chamber $b$. The steam generated in the chamber $b$ will flow through the tube 20 and enter the chamber $d$, where it will be highly super-heated by the action of the flames which are deflected from the walls of the conical recess 13 against the dependent walls 21 and bottom wall 16 of the upper portion 7 of the burner. The steam may be heated by this arrangement to such high degree as to liberate the hydrogen and oxygen elements and thereby form a combustible mixture, which will pass to the reservoir 26 and may be utilized with or without the hydro-carbon fuel to maintain combustion at the burner.

While I have shown and described specific embodiment of my invention, I do not limit myself to the exact details of construction shown, but may employ such changes in the details of construction and the arrangement of parts as come within the scope of the appended claims.

I claim:

1. A burner comprising a hollow lower portion and a hollow upper portion, both of which are divided into a pair of chambers; the chambers in the lower member being in open communication with the chambers of the upper member; said upper and lower members being spaced apart to form a combustion chamber therebetween, whereby flames generated between the members will heat the chambers; one pair of the superimposed chambers being provided for the purpose of heating a hydrocarbon fuel, the other chamber in the lower member serving as a steam generator and the superimposed chamber acting as a steam superheater.

2. A burner comprising a pair of spaced superimposed hollow members, each of which are divided into a pair of chambers, the chambers of one member communicating with the chambers of the other member for the purposes specified, and a burner nozzle projecting downwardly through the upper member for directing combustible fluid between said members.

3. A burner comprising a pair of spaced superimposed hollow members, each of which are divided into a pair of chambers, the chambers of one member communicating with the chambers of the other member for the purposes specified, and a burner nozzle projecting downwardly through the upper member for directing combustible fluid between said members, the lower burner member being formed with a conical recess opposite the burner nozzle for deflecting flames upwardly against the under side of the upper burner members.

4. A burner comprising a pair of spaced superimposed hollow members, each of which are divided into a pair of chambers, the chambers of one member communicating with the chambers of the other member for the purposes specified, and a burner nozzle projecting downwardly through the upper member for directing combustible fluid between said members, the lower burner member being formed with a conical recess opposite the burner nozzle for deflecting flames upwardly against the under side of the upper burner members, the upper member being formed with a dependent conical portion extending opposite the recess in the lower member to deflect flames directed thereagainst horizontally.

5. A burner comprising a pair of spaced superimposed hollow members, a pair of tubes connecting the interiors of said hollow members, a dependent conical flame spreader on the under side of the upper burner member, a nozzle projecting through the upper member centrally of said conical projection and arranged to discharge a combustible fluid between the burner members.

6. A burner comprising a pair of spaced superimposed hollow members, a pair of tubes connecting the interiors of said hollow members, a dependent conical flame spreader on the under side of the upper burner member, a nozzle projecting through the upper member centrally of said conical projection and arranged to discharge a combustible fluid between the burner members, said conical projection being formed with tapered ribs opposite the tubular connections adapted to inhibit flames impinging against the connection between the tubes and the upper member.

7. A burner comprising a lower hollow member having a steam generating chamber, an upper hollow member spaced above said lower member having a steam superheating chamber communicating with the steam generating chamber, a reservoir, a communication between said reservoir and the steam superheating chamber, a discharge pipe leading from said reservoir and extending downwardly through the upper burner member, a nozzle on said discharge pipe for directing the contents of the reservoir between the said burner members and the hydrocarbon discharge tube leading through said discharge pipe and opening within said nozzle.

8. A burner comprising a lower hollow member having a steam generating chamber, an upper hollow member spaced above said lower member having a steam superheating chamber communicating with the steam generating chamber, a reservoir, a communication between said reservoir and the steam superheating chamber, a discharge pipe leading from said reservoir and extending downwardly through the upper burner member, a nozzle on said discharge pipe for directing the contents of the reservoir between the said burner members and the hydrocarbon discharge tube leading through said discharge pipe and opening within said nozzle, said upper and lower members being formed with chambers apart from the steam generating and superheating chambers, through which a hydrocarbon fuel may be passed, a hydrocarbon feed pipe connecting with the chamber in the lower member and a hydrocarbon discharge pipe leading from the chamber in the upper member and connecting with the discharge tube.

ELMER PEMBERTON.